United States Patent [19]

Kraft

[11] 4,381,851

[45] May 3, 1983

[54] TRACK SPLICE

[75] Inventor: Joseph K. Kraft, Parsippany, N.J.

[73] Assignee: Westinghouse Electric Corp., Pittsburgh, Pa.

[21] Appl. No.: 242,753

[22] Filed: Mar. 11, 1981

[51] Int. Cl.³ .................... E01B 25/00; B65G 21/14

[52] U.S. Cl. .................... 238/232; 238/231; 238/151; 238/175; 198/329; 198/838

[58] Field of Search .............. 238/151, 175, 198, 226, 238/218, 227, 228, 243, 244, 263, 231, 232, 233, 230, 234; 198/838, 332, 329, 326; 403/393, 363, 377, 380, 364

[56] References Cited

U.S. PATENT DOCUMENTS

| | | | |
|---|---|---|---|
| 1,070,919 | 8/1913 | Rosson | 238/192 |
| 2,950,058 | 8/1960 | Watson | 238/179 |
| 2,953,832 | 9/1960 | Sands | 403/393 |
| 3,365,051 | 1/1968 | Mullis et al. | 198/137 |
| 4,130,192 | 12/1978 | Kraft | 198/327 |

FOREIGN PATENT DOCUMENTS

| | | | |
|---|---|---|---|
| 1114842 | 1/1959 | Fed. Rep. of Germany | 238/179 |

*Primary Examiner*—Robert B. Reeves
*Assistant Examiner*—James Barlow
*Attorney, Agent, or Firm*—D. R. Lackey

[57] ABSTRACT

A track splice having finger members fixed to the spaced ends of two track sections. The finger members include adjoining, contacting surfaces which are configured to positively align the finger members and wheel support surfaces of the finger members and associated track sections, while enabling the ends of the track sections to be adjustably spaced. The track splice further includes a clamping device for firmly clamping the finger members together, once the desired spacing between the track ends is selected.

11 Claims, 5 Drawing Figures

TRACK SPLICE

BACKGROUND OF THE INVENTION

1. Field of the Invention

The invention relates in general to track splices, and more specifically to a track splice for selecting and fixing a desired spacing between two track sections while smoothly continuing the track support surfaces.

2. Description of the Prior Art

Certain track sections having aligned wheel support surfaces thereon require initial and periodic dimensional adjustment when one or more of the track sections includes a curved portion, because of manufacturing tolerances, and wear of the apparatus which traverses the tracks. For example, U.S. Pat. No. 4,130,192 discloses an escalator which has continuous tracks for supporting an endless belt, each side of which is constructed of pivotally interconnected, rigid toothed links. Step axles interconnect the two sides, with main wheels or rollers being rotatably fixed to the ends of the step axles. The escalator steps are clamped to the step axles, and the steps include trailer wheels for proper positioning of the steps during the load and return runs. The support and guide tracks for both the main and trailer wheels are continuous throughout the travel loop, including the upper and lower turn-arounds. Manufacturing tolerances, and link wear, require initial, as well as periodic, dimensional adjustment of the turn-arounds relative to the intermediate portion of the apparatus. Thus, the two ends of each main and trailer guide track, on the right and left-hand sides of both the upper and low turn-arounds, must be adjustably spliced to the main and trailer tracks of the intermediate apparatus, making a total of 16 adjustment points. The turn-arounds are heavy and bulky, making the task of adjustably moving each turn-around, while smoothly and accurately continuing the guide surfaces of the tracks, very difficult, time consuming, and therefore costly. FIGS. 4 and 7 of U.S. Pat. No. 4,130,192 indicate turn-arounds having four slotted fingers per side, which is typical of the prior art track splice arrangements.

SUMMARY OF THE INVENTION

Briefly, the present invention is new and improved track splice which is self-aligning, rugged, and easily and quickly adjusted. One or more finger members are fixed to an end of each of the two track sections to be adjustably linked, with the finger members having wheel support surfaces which extend outwardly from the track ends in the same plane as the wheel support surface of the associated guide track. The sides of the finger members are cooperatively configured such that when the finger members from the two track sections are placed in contacting side-by-side relation, they nest to allow slidable movement in a direction parallel with the longitudinal dimension of the fingers, while resisting any misalignment between the fingers. Clamping means, which in the preferred embodiment is fixed to one of the finger members, firmly clamps the side portions of the finger members together, once the desired relative position of the finger members, and thus the two track sections, is selected. In a preferred embodiment, the side portions of the finger members are tongue and grooved. The tongue of one finger member enters the groove of the next adjacent finger member. The clamping means includes a bracket having set screws in one leg thereof which are advanced into the groove of one finger member. This forces this finger member tighty against the remaining finger members, the outer one of which is either fixed to another leg of the bracket, or positioned against still another leg of the bracket.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
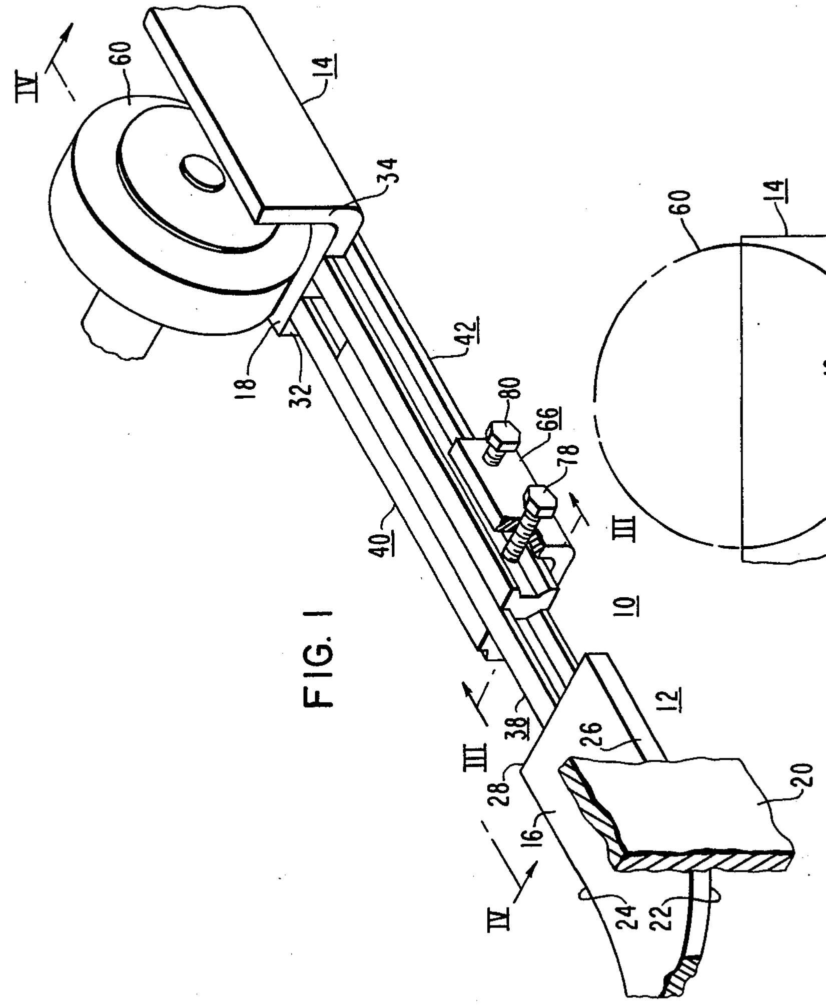
FIG. 1 is a perspective view of a track splice constructed according to the teachings of the invention.
Figure 4:
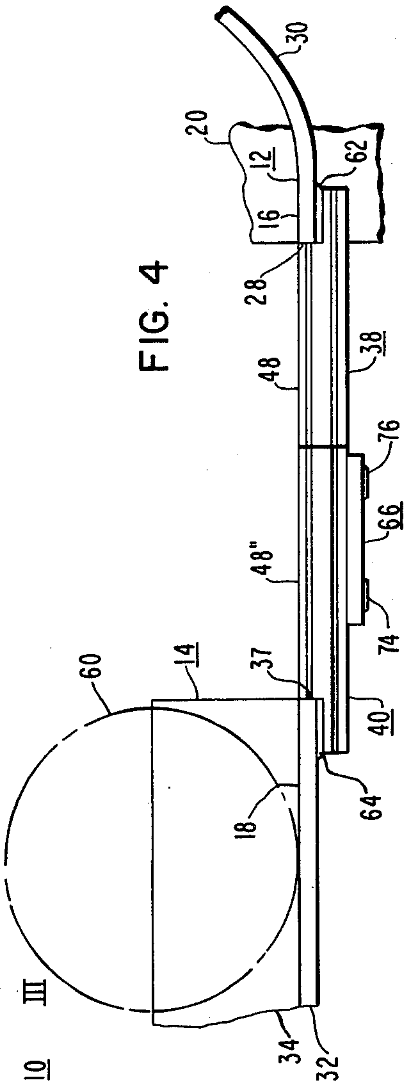
FIG. 4 is a side elevational view of the track splice shown in FIG. 1, taken between and in the direction of arrows IV—IV in FIG. 1.
Figure 2:
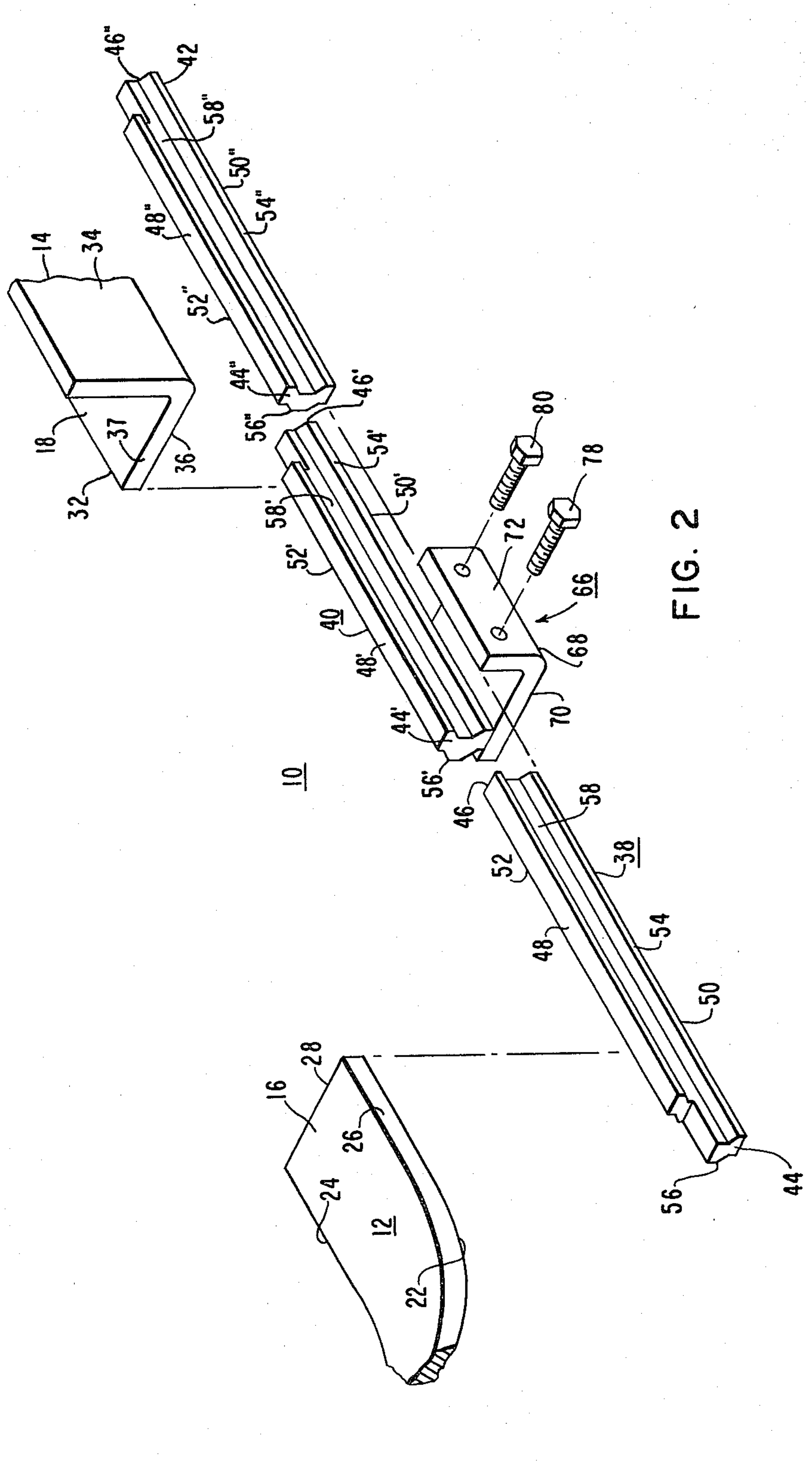
FIG. 2 is an exploded perspective view of the track splice shown in FIG. 1.
Figure 3:
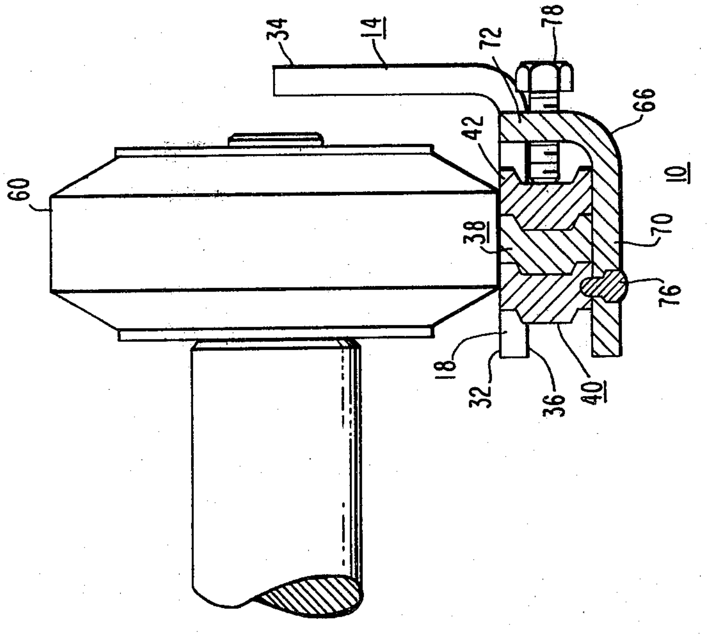
FIG. 3 is a cross-sectional view of the track splice shown in FIG. 1, taken between and in the direction of arrows III—III in FIG. 1.

Referring now to the drawings, and FIGS. 1 through 4 in particular, a track splice 10 is illustrated which is constructed according to a first embodiment of the invention. FIG. 1 is a perspective view of track splice 10, and FIG. 2 is an exploded perspective view. FIG. 3 is a cross-sectional view taken between arrows III—III in FIG. 1, and FIG. 4 is a side elevational view taken between arrows IV—IV in FIG. 1. Track splice 10 joins first and second track sections 12 and 14, respectively, which have wheel support surfaces 16 and 18, respectively, which are to be aligned in a common plane by track splice 10.

Track section 12 is illustrated as being a relatively thin, elongated metallic plate member which is welded, or otherwise fixed, to a vertically oriented metallic plate member 20, but any suitable structure may be used. Track section 12 includes a surface 22 opposed to support surface 16, and side portions 24 and 26. As illustrated in FIG. 4, track section 12 has a straight portion immediately adjacent to its end 28, but it may also include a curved portion 30, such as would be used for the main and trailer wheel tracks of an escalator turn-around. Track section 14, is illustrated as being a right angle member having first and second leg portions 32 and 34, respectively, such as might be used for the main and trailer wheel tracks of an escalator between the upper and lower turn-arounds, but any suitable structure may used. Leg member 32, in addition to the wheel support surface 18, includes an opposing surface 36, and an end 37.

Track splice 10, in the embodiment of FIGS. 1-4, includes first, second and third elongated, metallic finger members 38, 40 and 42, respectively. The finger members may all have a like cross-sectional configuration, and thus they may all be cut from the same bar. As illustrated in FIG. 2, finger member 38 has first and second ends 44 and 46, respectively, a wheel support surface 48 which extends in a direction between its ends, an longitudinal opposite or opposing surface 50, and first and second side portions 52 and 54, respectively. The side portions are not a single flat surface, but are cooperatively configured such that they will nest when like oriented fingers are placed in contacting side-by-side relation. As illustrated, side portions 52 and 54 are preferably formed with a tongue 56 and a groove 58, respectively, configured and dimensioned such that the tongue on one finger member will snugly enter the groove on an adjacent finger member, allowing slidable relative movement between them in a direction between the ends of the finger members, but resisting relative movement in any other direction.

The various surfaces of finger members 40 and 42 have been given the same reference numerals as finger member 38, with the addition of single and double prime marks, respectively.

Finger member 38 is fixed to track section 12 such that its wheel support surface 48 is in the same plane as the wheel support surface 16 of track section 12, with finger 38 extending outwardly from end 28. Finger member 38 is placed relative to the width dimension of track section 12 such that a line drawn on support surface 48 of finger member 38, between its ends 44 and 46, along the midpoint of the surface, will coincide with the midpoint of the tread of a wheel 60 which will roll on the track section 12. In order to orient wheel support surfaces 16 and 48 of track section 12 and finger member 36, respectively, in a common plane, a portion of finger member 38 is removed, starting from surface 48, at end 44, for a depth equal to the thickness dimension of track section 12. As illustrated in FIG. 4, the upper surface of the cut-away portion is placed against the bottom surface 22 of track section 12, and finger 38 is welded to track section 12, as indicated by weld bead 62.

In like manner, finger members 40 and 42 are fixed to track section 14 such that their wheel support surfaces 48' and 48" are in the same plane as the wheel support surface 18 of track section 14, with finger members 40 and 42 extending outwardly from its end 37. Surfaces 48' and 48" are recessed adjacent to ends 46' and 46", respectively, by the thickness of leg member 32 of track section 14, and they are welded to the surface 36, in a manner similar to that described for finger member 38, such as indicated by weld bead 64. Finger members 40 and 42 are disposed in spaced parallel relation such that finger member 38 may snugly but slidably enter the space between them, with tongue 56" entering groove 58, and with tongue 56 entering groove 58'. As shown in FIG. 3, the width dimension of the wheel support surfaces 48, 48' and 48" is selected such that surface 48 supports 50% of the wheel tread, and surfaces 48' and 48" each support 25%. Thus, when wheel 60 rolls across track splice 10, it will always have at least 50% of its tread supported.

Once the desired spacing between ends 28 and 37 of the track sections is established, the adjacent contacting surfaces of the finger members are clamped firmly together by clamping means 66.

Clamping means 66, in the embodiment of FIGS. 1–4, includes a right angle bracket 68 having first and second leg members 70 and 72, respectively. The opposing surface 50' of the outer finger of the finger group which has its tongue exposed is placed on leg portion 70 and firmly attached thereto, such as by plug welds 74 and 76 shown in FIG. 4. The opposing surfaces 50 and 50" of fingers 38 and 42 are also disposed in contact with the upper surface of leg member 70 of bracket 68. Leg member 72 has threaded openings therein for receiving set screws 78 and 80, with the set screws being located and sized to snugly enter groove 58". Tightening screws 78 and 80 firmly against groove 58" provides a pressure contact which forces the fingers tightly together, maintaining the selected position of track splice 10. To readjust the spacing between the track sections, screws 78 and 80 are loosened slightly, which enables relative movement between the fingers in a direction between their ends, without loosing alignment, i.e., the tongues remain in the grooves and the screws remain in the groove.

Figure 5:
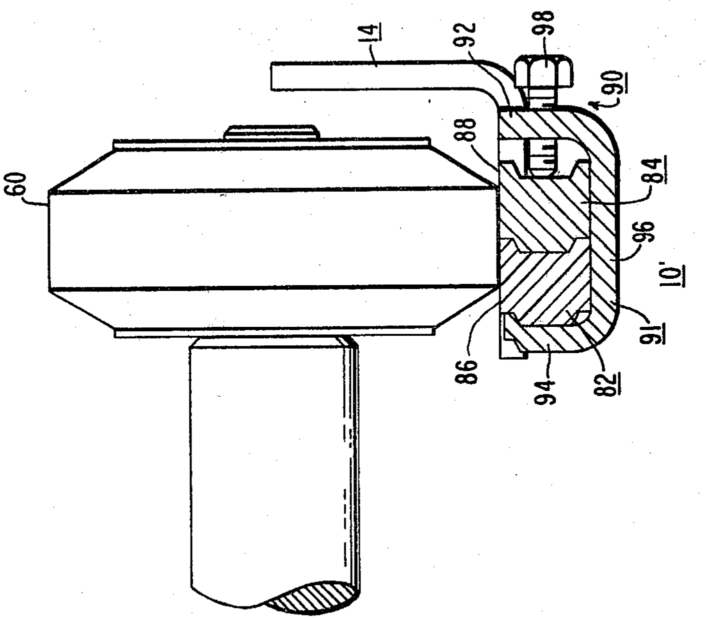
FIG. 5 is a cross-sectional view, similar to that of FIG. 3, except illustrating a track splice constructed according to another embodiment of the invention.

FIG. 5 is a cross-sectional view of a track splice 10' constructed according to another embodiment of the invention. This embodiment illustrates that two fingers may be used, instead of three, if desired. This embodiment also illustrates that the clamping means may be modified to maintain its assembled position about the group of fingers, without attaching one of the finger members thereto. Unmodified elements of FIG. 5 are given the same reference numerals as FIGS. 1–4.

More specifically, first and second finger members 82 and 84 are provided, which are similar to finger members 38, 40 and 42 in cross-sectional configuration, but they have wider wheel support surfaces 86 and 88, respectively. Finger members 82 and 84 are attached to track sections 12 and 14, respectively, such that when placed side-by-side the line of contact between their wheel support surfaces bisects the tread of wheel 60. Thus, each finger member supports 50% of the tread, and the wheel will have at least 50% support as it traverses the track splice 10', the same as when it traverses track splice 10. Finger member 82 may be plug welded to a bracket, similar to bracket 66 in the FIGS. 1–4 embodiment.

FIG. 5 also illustrates that a clamping means 90 may be provided having a bracket 91. In this embodiment, bracket 91 has a channel-shaped cross-sectional configuration, including first and second spaced, upstanding leg members 92 and 94, and an interconnecting bight 96. Set or clamp screws, such as clamp screw 98, are threadably engaged with openings provided through leg member 92. The upper end of leg member 94 is bent inwardly to cooperate with the tongue on finger member 82, such that when the clamp screws are advanced into the groove of finger member 84, bracket 91 is maintained in assembled relation about the group of finger members, even when the clamp screws are loosened slightly to allow adjustment of the track splice.

In summary, there has been disclosed a new and improved track splice which may be constructed of rugged, tongue and grooved fingers, which are self-aligning, even when the track splice is being dimensionally adjusted. The clamping means, in addition to fixing the selected position of the track splice, adds to the self-alignment feature during adjustment as its set screws ride in the groove on one side of a finger member. The set screw and groove combination also provides self-centering forces on the finger members, which prevent a finger member from moving upwardly from its proper position on the bracket. The track splice, while rugged, may be constructed quickly of low cost parts, as each finger member has a like cross-sectional configuration. Finally, the track splice of the invention allows quick, accurate dimensional adjustment, even when a plurality of track splices are involved, such as eight at each turn-around of an escalator. This is due to the fact that the eight track splices may all be loosened slightly, and the whole turn-around adjusted in, or out, without any danger of misalignment. Once the desired new position is achieved, the clamp screws of the track splices are simply tightened to retain the newly selected position.

I claim as my invention:

1. An adjustable length, self-aligning, smoothly continuous track splice, comprising:

first and second track sections having ends to be adjustably spaced and wheel support surfaces to be aligned, first and second finger members each having first and second ends, a wheel support surface extending between their ends, a surface opposing said wheel support surface, and first and second side portions disposed between said wheel support and opposing surfaces, means fastening the first end of said first finger member to the end of said first track section such that its second end extends outwardly therefrom, with their wheel support surfaces in alignment, means fastening the second end of said second finger member to the end of said second track section such that its first end extends outwardly therefrom, with their wheel support surfaces in alignment, said first and second finger members having like cross-sectional configurations, with their first side portions each having a longitudinally extending tongue and their second side portions each having a longitudinally extending groove, said first and second finger members being disposed in contacting side-by-side relation, with the tongue and grooves being dimensioned such that the tongue on one finger member snugly enters the groove of the other finger member to longitudinally align said first and second finger members, to allow relative sliding movement therebetween in a direction between their ends, while resisting relative movement in any other direction, to enable the ends of said first and second track sections to be spaced by a selected dimension, while maintaining the wheel support surfaces of said first and second track sections and said first and second finger members in a common plane, and to provide a free groove on one outer side of the resulting assembly, and a free tongue on the other, and clamping means for adjustably clamping the adjoining surfaces of said first and second finger members tightly together, said clamping means including means for entering and contacting the surface of said free groove on the outside of the assembled finger members, to maintain the selected dimension between the ends of said first and second track sections.

2. The track splice of claim 1 including a third finger member having first and second ends, a wheel support surface extending between its ends, a surface opposing said wheel support surface, and first and second side portions, said third finger member having a cross-sectional configuration similar to that of the first and second finger members, including a longitudinally extending tongue on its first side portion and a longitudinally extending groove on its second side portion, and means fastening the second end of said third finger member to the end of said second track section such that its first end extends outwardly therefrom with their wheel support surfaces in alignment, said third and first finger members being disposed in contacting side-by-side relation, with the tongue on one finger member snugly entering the groove of the other finger member to provide a free groove on an outer side of the resulting assembly, and a free tongue on the other, and to enable adjustment in the dimension between the ends of the first and second track sections, with the clamping means tightly clamping the adjoining surfaces of the first, second and third finger members together.

3. The track splice of claim 1 wherein the clamping means includes an angle member having a first leg portion for supporting the opposing surfaces of the finger members, and a second leg portion, and wherein the means which enters and contacts the free groove includes screws threadably engaged with openings in said second leg portion.

4. The track splice of claim 2 wherein the clamping means includes an angle member having a first leg portion for supporting the opposing surfaces of the finger members, and a second leg portion, and wherein the means which enters and contacts the free groove includes screws threadably engaged with openings in said second leg portion.

5. The track splice of claim 1 wherein the clamping means includes an angle member having a first leg portion for supporting the opposing surfaces of the first and second finger members, and joining means permanently fixing said first leg portion to the finger member which provides the free tongue on one side of the assembly.

6. The track splice of claim 2 wherein the clamping means includes an angle member having a first leg portion for supporting the opposing surfaces of the first, second and third finger members, and joining means permanently fixing said first leg portion to the finger member which provides the free tongue on one side of the assembly.

7. The track splice of claim 6 wherein the angle member includes a second leg portion, and wherein the means which enters and contacts the free groove includes screws threadably engaged with openings in said second leg portion.

8. The track splice of claim 1 wherein the clamping means includes a channel member having first and second spaced leg portions, and an interconnecting bight, and the means which enters and contacts the free groove includes screws threadably engaged with openings through the first leg portion, said screws being in pressure contact with the groove surface in the second side portion of the second finger member, to force the first side portion of the first finger member against the second leg portion of said channel member.

9. The track splice of claim 8 wherein the second leg portion of the channel member is configured to cooperate with and snugly receive the free tongue on an outer side of the assembly, to aid in maintaining the finger members in contact with the bight when the screws are tightened against the finger member which has the free groove.

10. An adjustable length, self-aligning, smoothly continuous track splice comprising:

first and second track sections having ends to be adjustably spaced and wheel support surfaces to be aligned, first, second and third finger members each having first and second ends, a wheel support surface extending between its ends, a surface opposing said wheel support surface, and first and second side portions disposed between said wheel support and opposing surfaces, means fastening the first end of said first finger member to the end of said first track section such that its second end extends outwardly therefrom, with their wheel support surfaces in alignment, means fastening the second ends of said second and third finger members to the end of said second track section such that their first ends extend outwardly therefrom, with their wheel support surfaces in alignment, and their facing side portions in spaced parallel relation, said first, second and third finger members all having like cross-sectional configurations, with their first side portions having a longitudinally extending tongue and their second side portions having a longitudinally extending groove, said first finger member being disposed in contacting side-by-side relation between said spaced second and third finger members, with the tongue and grooves being dimensioned such that the tongues on the first and second finger members enter the grooves of the third and second finger members, respectively, to longitudinally align said first, second and third finger members to allow relative sliding movement therebetween in a direction between their ends, while resisting motion in any other direction, to enable the ends of said first and second track sections to be spaced by a selected dimension, while simultaneously orienting the wheel support surfaces of said first and second track sections and said first, second and third finger members, in a common plane, and to provide a free groove on one side of the resulting assembly, and clamping means for clamping the adjoining surfaces of said first, second and third finger members tightly together, said clamping means including means for entering and contacting the surface of said free groove on the outside of the assembled first, second and third finger members, to maintain the selected dimension between the ends of said first and second track sections.

11. The track splice of claim 10 wherein the means of the clamping means which enters the free groove includes set screws which cooperate with the groove to clamp the finger members tightly together.

* * * * *